US008736963B2

(12) United States Patent
Robbins et al.

(10) Patent No.: US 8,736,963 B2
(45) Date of Patent: May 27, 2014

(54) TWO-DIMENSIONAL EXIT-PUPIL EXPANSION

(75) Inventors: Steve Robbins, Bellevue, WA (US); David D. Bohn, Fort Collins, CO (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/426,385

(22) Filed: Mar. 21, 2012

(65) Prior Publication Data

US 2013/0250431 A1 Sep. 26, 2013

(51) Int. Cl.
*G02B 27/14* (2006.01)
*G02B 27/01* (2006.01)

(52) U.S. Cl.
CPC .......... *G02B 27/0172* (2013.01); *G02B 27/144* (2013.01)
USPC ............ 359/633; 359/629; 359/630; 359/631

(58) Field of Classification Search
CPC ......................... G02B 27/144; G02B 27/0172
USPC .................................................. 359/629–633
See application file for complete search history.

(56) References Cited

U.S. PATENT DOCUMENTS

| 5,610,936 | A | 3/1997 | Cantoni |
| 6,049,641 | A | 4/2000 | Deacon et al. |
| 6,162,655 | A | 12/2000 | Johnson et al. |
| 6,185,045 | B1* | 2/2001 | Hanano ......................... 359/631 |
| 6,289,153 | B1 | 9/2001 | Bergmann |
| 7,262,918 | B1* | 8/2007 | Yoo et al. ...................... 359/629 |
| 7,269,317 | B2 | 9/2007 | Blauvelt et al. |
| 7,778,305 | B2 | 8/2010 | Parriaux et al. |
| 2010/0103078 | A1* | 4/2010 | Mukawa et al. .................. 345/8 |

OTHER PUBLICATIONS

Cameron, Alex., "The Application of Holographic Optical Waveguide Technology to Q-Sight™ Family of Helmet Mounted Displays", Retrieved at <<http://144.206.159.178/ft/CONF/16431969/16431986.pdf>>, Proceedings of the SPIE, vol. 7326, 2009, pp. 11.
Mukawa, et al., "A full-color eyewear display using planar waveguides with reflection volume holograms", Journal of the SID, 2009, pp. 185-193.
Eisenberg, Hagai "Nonlinear Effects in Waveguide Arrays", Retrieved at <<http://www.phys.huji.ac.il/~hagaie/files/HagaiElectronicThesis.pdf>> Nov. 2002, pp. 75.

* cited by examiner

*Primary Examiner* — Scott J Sugarman
*Assistant Examiner* — Daniele Manikeu
(74) *Attorney, Agent, or Firm* — Judy Yee; Micky Minhas (57) ABSTRACT

A near-eye display system includes an image former and first and second series of mutually parallel beamsplitters. The image former is configured to form a display image and to release the display image through an exit pupil. The first series of mutually parallel beamsplitters is arranged to receive the display image from the image former. The second series of mutually parallel beamsplitters is arranged to receive the display image from the first series of beamsplitters, and to release the display image through an exit pupil longer and wider than that of the image former. The second series of beamsplitters has a different alignment and a different orientation than the first series of beamsplitters.

20 Claims, 7 Drawing Sheets

TWO-DIMENSIONAL EXIT-PUPIL EXPANSION

BACKGROUND

Near-eye display technology may be used to present video or computer-display imagery with utmost privacy and mobility. Such technology may be incorporated into a head-mounted display (HMD) device in the form of eyeglasses, goggles, a helmet, a visor, or other eyewear. In a typical near-eye display approach, a small-format display image is received into suitable optics and re-directed toward a wearer's eye. One challenge in this area is to present the display image over a sufficiently expansive exit pupil, but without resorting to large, unwieldy optics that the wearer may find objectionable.

SUMMARY

This disclosure describes a near-eye display system including an image former and first and second series of mutually parallel beamsplitters. The image former is configured to form a display image and to release the display image through an exit pupil. The first series of mutually parallel beamsplitters is arranged to receive the display image from the image former. The second series of mutually parallel beamsplitters is arranged to receive the display image from the first series of beamsplitters, and to release the display image through an exit pupil longer and wider than that of the image former. The second series of beamsplitters has a different alignment and a different orientation than the first series of beamsplitters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Aspects of this disclosure will now be described by example and with reference to the illustrated embodiments listed above. Components that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
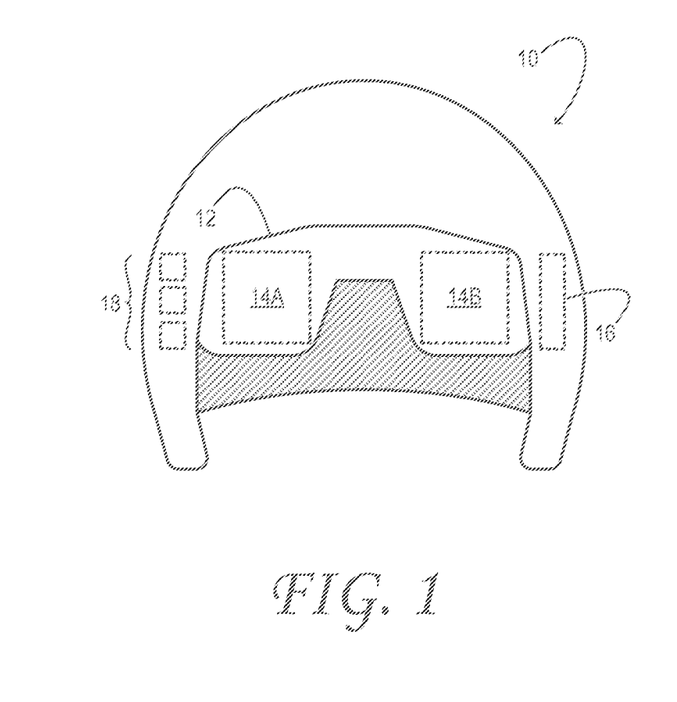
FIGS. 1 and 2 show example HMD devices in accordance with embodiments of this disclosure.

FIG. 1 shows an example HMD device 10 in one embodiment. HMD device 10 is a helmet having a visor 12. Between the visor and each of the wearer's eyes is arranged a near-eye display system 14: system 14A is arranged in front of the right eye; system 14B is arranged in front of the left eye. The HMD device also includes controller 16 and sensors 18. The controller is a microcomputer operatively coupled to both near-eye display systems and to the sensors.

Sensors 18 may be arranged in any suitable location in HMD device 10. They may include a gyroscope or other inertial sensor, a global-positioning system (GPS) receiver, and/or a barometric pressure sensor configured for altimetry. These sensors may provide data on the wearer's location or orientation. From the integrated responses of the sensors, controller 16 may track the movement of the HMD device within the wearer's environment.

In one embodiment, sensors 18 may include an eye-tracker—i.e., a sensor configured to detect an ocular state of the wearer of HMD device 10. The eye tracker may locate a line of sight of the wearer, measure an extent of iris closure, etc. If two eye trackers are included, one for each eye, then the two may be used together to determine the wearer's focal plane based on the point of convergence of the lines of sight of the wearer's left and right eyes. This information may be used by controller 16 for placement of a computer-generated display image, for example.

In the illustrated embodiment, each near-eye display system 14 is at least partly transparent, to provide a substantially unobstructed field of view in which the wearer can directly observe his physical surroundings. Each near-eye display system is configured to present, in the same field of view, a computer-generated display image. Controller 16 may control the internal componentry of near-eye display systems 14A and 14B in order to form the desired display images. In one embodiment, controller 16 may cause near-eye display systems 14A and 14B to display the same image concurrently, so that the wearer's right and left eyes receive the same image at the same time. In another embodiment, the near-eye display systems may project somewhat different images concurrently, so that the wearer perceives a stereoscopic, i.e., three-dimensional image. In one scenario, the computer-generated display image and various real images of objects sighted through a near-eye display system may occupy different focal planes. Accordingly, the wearer observing a real-world object may have to shift his or her corneal focus in order to resolve the display image. In other scenarios, the display image and at least one real image may share a common focal plane.

In the HMD devices disclosed herein, near-eye display system 14 may also be configured to acquire video of the surroundings sighted by the wearer. The video may include depth video. It may be used to establish the wearer's location, what the wearer sees, etc. The video acquired by the near-eye display system may be received in controller 16, and the controller may be configured to process the video received. To this end, near-eye display system 14 may include a camera. The optical axis of the camera may be aligned parallel to a line of sight of the wearer of the HMD device, such that the camera acquires video of the external imagery sighted by the wearer. As the HMD device may include two near-eye display systems—one for each eye—it may also include two cameras. More generally, the nature and number of the cameras may differ in the various embodiments of this disclosure. One or more cameras may be configured to provide video from which a time-resolved sequence of three-dimensional depth maps is obtained via downstream processing.

Figure 2:
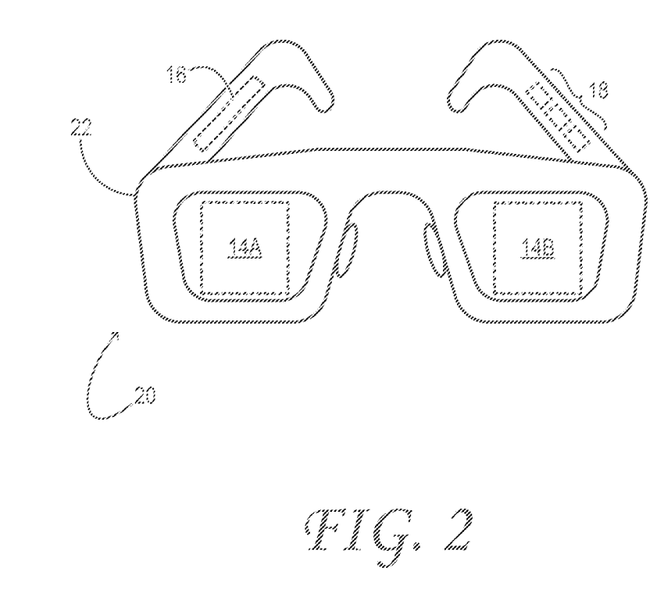

FIG. 2 shows another example HMD device 20. HMD device 20 may closely resemble an ordinary pair of eyeglasses or sunglasses, but it too includes near-eye display systems 14A and 14B, sensors 18, and controller 16. HMD device 20 also includes wearable mount 22, which positions the near-eye display systems a short distance in front of the wearer's eyes. In the embodiment of FIG. 2, the wearable mount takes the form of conventional eyeglass frames.

No aspect of FIG. 1 or 2 is intended to be limiting in any sense, for numerous variants are contemplated as well. In some embodiments, for example, a vision system separate from near-eye display systems 14 may be used to acquire video of what the wearer sees. In some embodiments, a binocular near-eye display system extending over both eyes may be used instead of the monocular near-eye display system shown in the drawings. Likewise, an HMD device may include a binocular eye tracker. In some embodiments, an eye tracker and near-eye display system may be integrated together, and may share one or more optics.

The HMD devices disclosed herein may be used to support a virtual-reality (VR) or augmented-reality (AR) environment for one or more participants. A realistic AR experience may be achieved with each AR participant viewing his environment naturally, through passive optics of the HMD device. Computer-generated imagery, meanwhile, may be projected into the same field of view in which the real-world imagery is received. Imagery from both sources may appear to share the same physical space.

The controller in the HMD device may be configured to run one or more computer programs that support the VR or AR environment. In some embodiments, some computer programs may run on an HMD device, and others may run on an external computer accessible to the HMD device via one or more wired or wireless communication links. Accordingly, the HMD device may include suitable wireless componentry, such as Wi-Fi.

Figure 3:
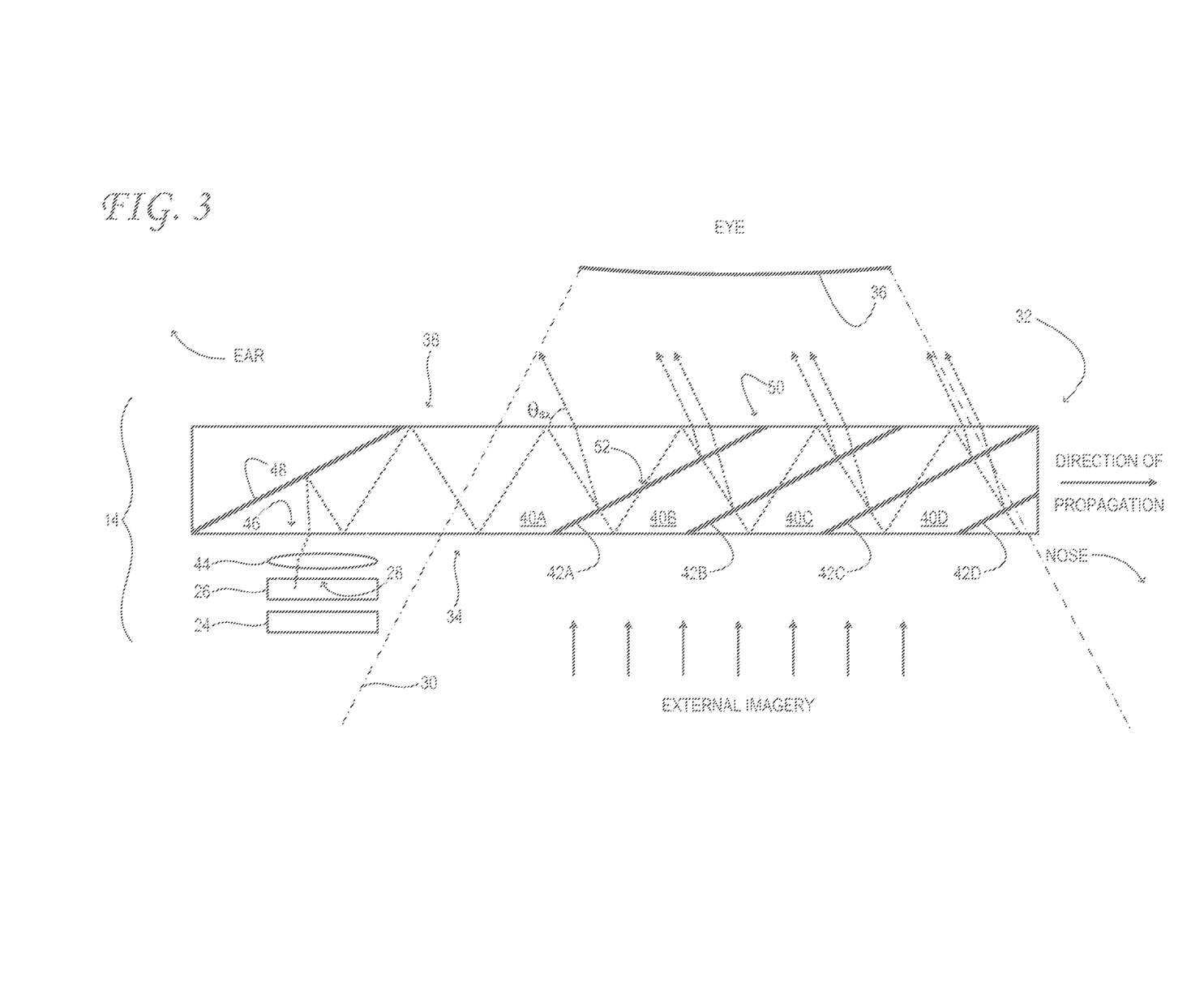
FIG. 3 shows aspects of an example near-eye display system in cross section, in accordance with an embodiment of this disclosure.

FIG. 3 shows selected aspects of near-eye display system 14 in one embodiment. The illustrated near-eye display system includes illuminator 24 and image former 26. The illuminator may comprise a white-light source, such as a white light-emitting diode (LED). The illuminator may further comprise an optic suitable for collimating the emission of the white-light source and directing the emission into the image former. The image former is configured to form a display image and to release the display image through exit pupil 28. The image former may comprise a rectangular array of light valves, such as a liquid-crystal display (LCD) array. The light valves of the array may be arranged to spatially vary and temporally modulate the amount of collimated light transmitted therethrough, so as to form pixels of a display image. Further, the image former may comprise suitable light-filtering elements in registry with the light valves so that the display image formed is a color image.

In other embodiments, the image former may be a reflective liquid-crystal-on-silicon (LCOS) or digital micromirror display (DMD) device. In these embodiments, a transparent illuminator 24 may be arranged on the opposite side of the image former. In another embodiment, illuminator 24 may comprise one or more modulated lasers, and image former 26 may be a rastering optic. The image former may be configured to raster the emission of each laser in synchronicity with its modulation, to form the display image. In yet another embodiment, image former 26 may comprise a rectangular array of color LEDs (e.g., organic LEDs) arranged to form the display image. As each color LED array emits its own light, illuminator 24 may be omitted from this embodiment. The various active components of near-eye display system 14—e.g., image former 26 and illuminator 24, if included—may be operatively coupled to controller 16. The controller may provide suitable control signals that, when received by the image former, cause the desired display image to be formed.

In FIG. 3, image former 26 is shown offset from field of view 30 of the HMD-device wearer. In this configuration, the image former does not obstruct the wearer's view of external imagery transmitted through the HMD device. Accordingly, near-eye display system 14 also includes waveguide 32, an optic configured to receive the display image and to shift the display image into the wearer's field of view.

Waveguide 32 may be substantially transparent to external imagery received normal to its front surface 34. Thus, the waveguide may be positioned in front of the eye of the HMD-device wearer without obstructing the wearer's view of the external imagery. In the embodiment shown in FIG. 3, image former 26 and the anatomical entry pupil 36 of the wearer are located on opposite faces of the waveguide: the image former is adjacent front surface 34, while the wearer's pupil is behind back surface 38. Light from the display image propagates through the waveguide by reflection from the front and back surfaces. In the illustrated embodiment, the direction of propagation is from the end portion of the waveguide closest to the wearer's ear to the opposite end portion, which is oriented toward the bridge of the wearer's nose.

Continuing in FIG. 3, image former 26 may be a compact component characterized by a small exit pupil 28. The diameter of the exit pupil of the image former may be 5 millimeters (mm), in one example. When two components are optically coupled, it is desirable for the exit pupil of the upstream component to be about the same size as the entry pupil of the downstream component. If the exit pupil is smaller than the entry pupil, transmission of the image may require very precise alignment of the pupils. Even then, the transmitted image may appear vignetted. If the exit pupil is larger than the entry pupil, a loss of image brightness will occur. In the present case, the downstream component that receives the display image is the wearer's eye, which presents an entry pupil up to 9 mm in diameter under low-light conditions. Accordingly, in the embodiments described herein, waveguide 32 is configured not only to shift the display image into the wearer's field of view, but also to release the display image from an exit pupil larger than that of the image former.

To this end, waveguide 32 includes a series of transparent sections 40 (40A, 40B, etc.) arranged end-to-end, with beamsplitters 42 (42A, 42B, etc.) arranged between adjacent pairs of transparent sections. In some embodiments, each beamsplitter may be formed as a coating supported on its respective transparent section. In the embodiment shown in FIG. 3, the beamsplitters of waveguide 32 are arranged in parallel—i.e., at the same angle with respect to the front and back surfaces of the waveguide.

Figure 4:
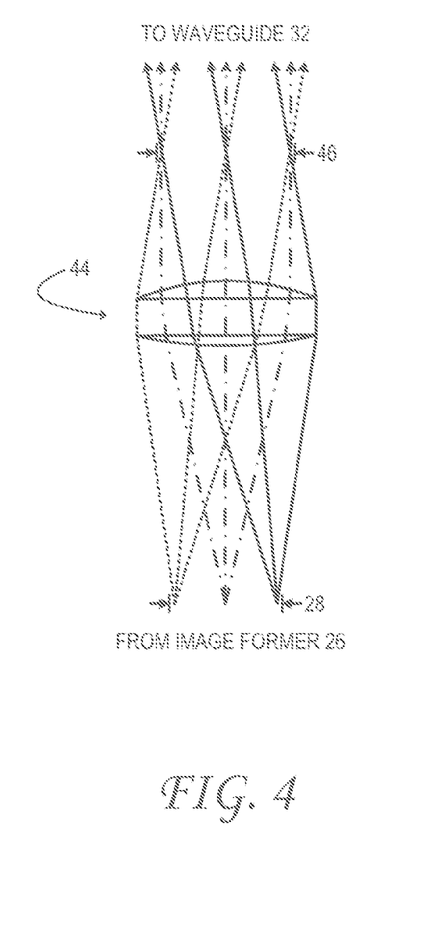
FIG. 4 schematically shows light rays from an image former passing through a collimating lens and towards a waveguide, in accordance with an embodiment of this disclosure.

FIG. 3 shows collimating lens 44 arranged to receive a diverging display image from image former 26, to collimate the display image, and to direct the collimated image into entry pupil 46 of waveguide 32. The entry pupil of the waveguide may be approximately the same size as the exit pupil of the image former—5 mm or less in some embodiments. The image former may be positioned one focal length away from the collimating lens, so that light from each pixel of the display image emerges collimated from the lens, but at a unique angle that depends on the location of that pixel within the display image. FIG. 4 illustrates this principle schematically. Here, divergent light from exit pupil 28 of the image former is received into entry pupil 46 of the waveguide. The collimating lens may be a rectangular trimmed lens set, in one embodiment. Such a lens may be used to expand the exit pupil in the vertical direction—viz., the direction orthogonal to the direction of propagation of light through waveguide 32.

Returning now to FIG. 3, light from collimating lens 44 is received into waveguide 32 and is reflected from mirror 48. The mirror reflects the light into the first of the series of transparent sections 40 of the waveguide. Ideally, each ray of display light reflected from the mirror will encounter front surface 34 of the waveguide above the Snell's Law critical angle and propagate through the transparent section by total internal reflection (TIR). At the end of each transparent section, the light ray encounters a beamsplitter 42. In one embodiment, the beamsplitter may be an interference structure configured to partially transmit and partially reflect a suitably oriented light ray, as shown in FIG. 3. The reflected ray from the beamsplitter exits the waveguide through back surface 38, while the transmitted ray propagates through to the next transparent section, encounters the next beamsplitter, and is itself split into a transmitted and a reflected ray. In this manner, a single light ray received into waveguide 32 is split into a plurality of parallel light rays distributed along the direction of propagation in the waveguide. This action effectively expands the exit pupil 50 of the waveguide, relative to that of image former 26, in the horizontal direction. As a result of such expansion, the width of the exit pupil of the waveguide may be 9 mm or greater in some embodiments. The height of the exit pupil, as noted above, may be determined by the properties of the collimating lens.

It will be understood that the terms 'horizontal', 'vertical', 'width', and 'height' are used primarily to establish relative orientations in the illustrated embodiments, for ease of description. These terms may be intuitive for one usage scenario—e.g., when the wearer of the near-eye display device is upright and forward-facing—and less intuitive for other usage scenarios. Nevertheless, the listed terms should not be construed to limit the scope of the configurations and usage scenarios contemplated herein. For instance, a horizontal or vertical orientation may be aligned with any arbitrary axis of a user's eye and/or HMD device without departing from the scope of this disclosure.

Figure 5:
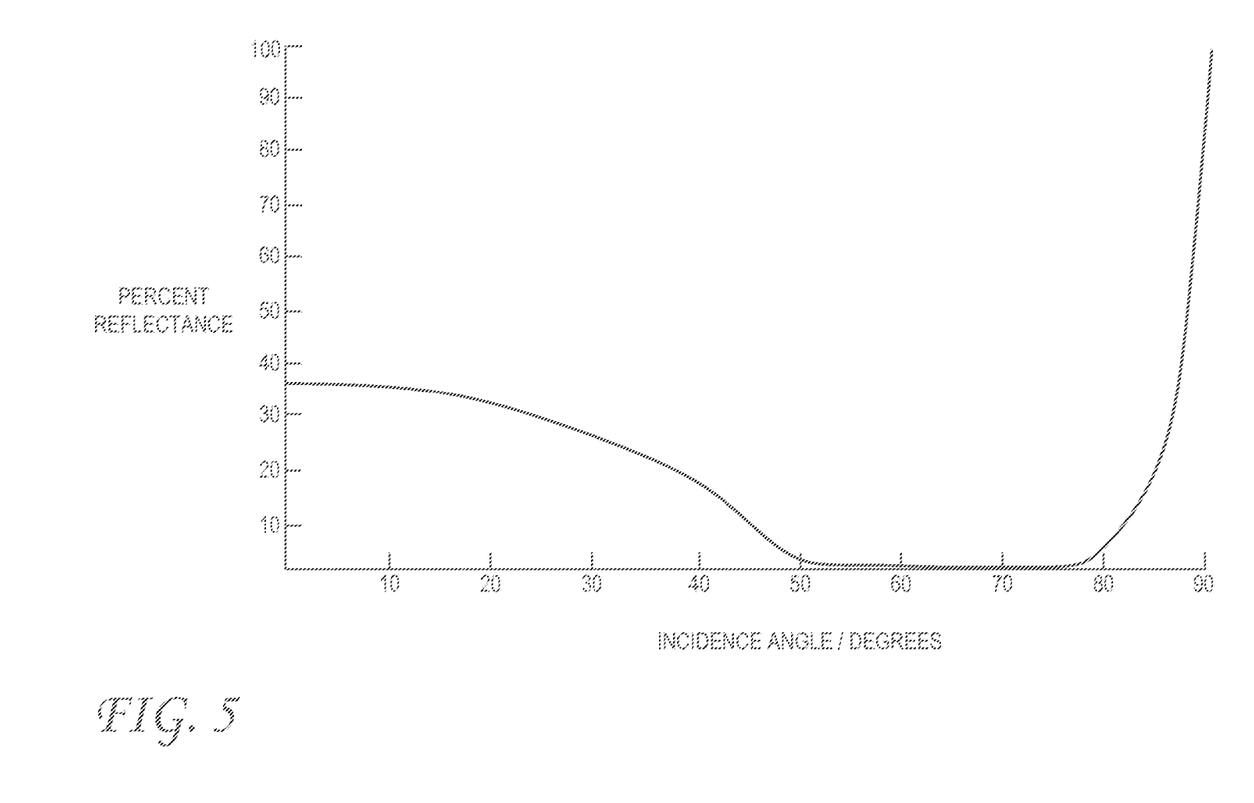
FIG. 5 is a graph illustrating the reflectance of a beamsplitter as a function of incidence angle, in accordance with an embodiment of this disclosure.

Referring again to FIG. 3, the desired beam splitting occurs when a light ray encounters the back side of a beamsplitter, the side opposite back surface 38 of waveguide 32. However, a light ray may also encounter the front side of a beamsplitter, the side opposite front surface 34. The desired result of this encounter is for the light ray to pass directly through the beamsplitter, as shown by example at intersection 52. Accordingly, beamsplitters 42 may each comprise a coating with incidence-angle dependent reflectance. The reflectance properties of such a coating are illustrated in the graph of FIG. 5. The example coating represented in the graph is substantially transmissive at incidence angles within a range of 50 to 80°, and partially reflective outside of this range. In one embodiment, each beamsplitter may comprise a rugate coating having a large number of dielectric layers (e.g., 200 or more), to optimize the performance of the waveguide. It will be noted that the incidence angles of light rays upon an interface are referenced herein against a line drawn normal to the interface, unless otherwise indicated.

Near-eye display configurations as described above offer the desirable properties of display-image shifting and exit-pupil expansion, but are limited in the degree to which the exit pupil can be expanded in the vertical direction—i.e., orthogonal to the direction of propagation through the waveguide. This is because the vertical expansion is done solely by collimating lens 44.

To form a relatively small exit pupil, or one that transmits the display image over a narrow field of view, a compact collimating lens may suffice. However, for larger exit pupils and larger fields of view, a proportionately larger and thicker lens is needed. For the HMD devices envisaged herein, it is desirable for the near-eye display system to present an exit pupil at least 12 mm high, that supports field of view of 36 to 48°. Ray-trace analysis reveals that a collimating lens 64 to 70 mm in height may be required to present such a pupil. However, a lens of these dimensions may be too large for use in an HMD device—particularly one designed to resemble ordinary eyewear. Accordingly, this disclosure describes an approach in which the exit pupil is expanded in both the horizontal and vertical directions using waveguide-embedded beamsplitters. In this approach, the collimating lens is used only to couple the display image into the waveguide structure, not to expand the exit pupil. This feature greatly reduces the required size of the collimating lens, which is a great advantage in the design of compact HMD devices.

Figure 6:
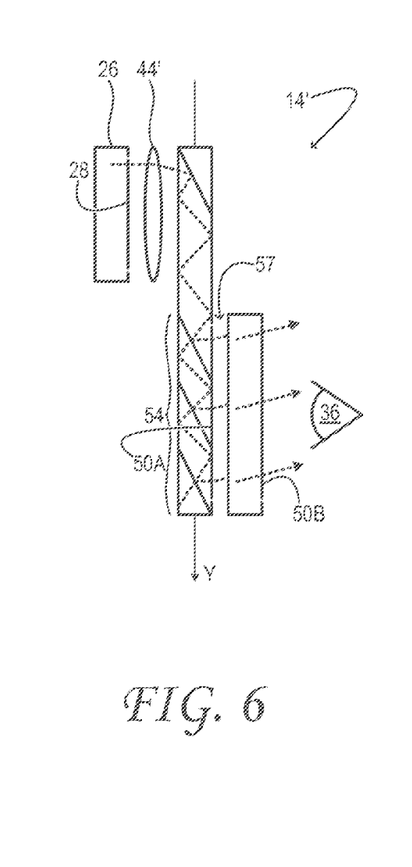
FIG. 6 shows a side view of a near-eye display system in accordance with an embodiment of this disclosure.
Figure 7:
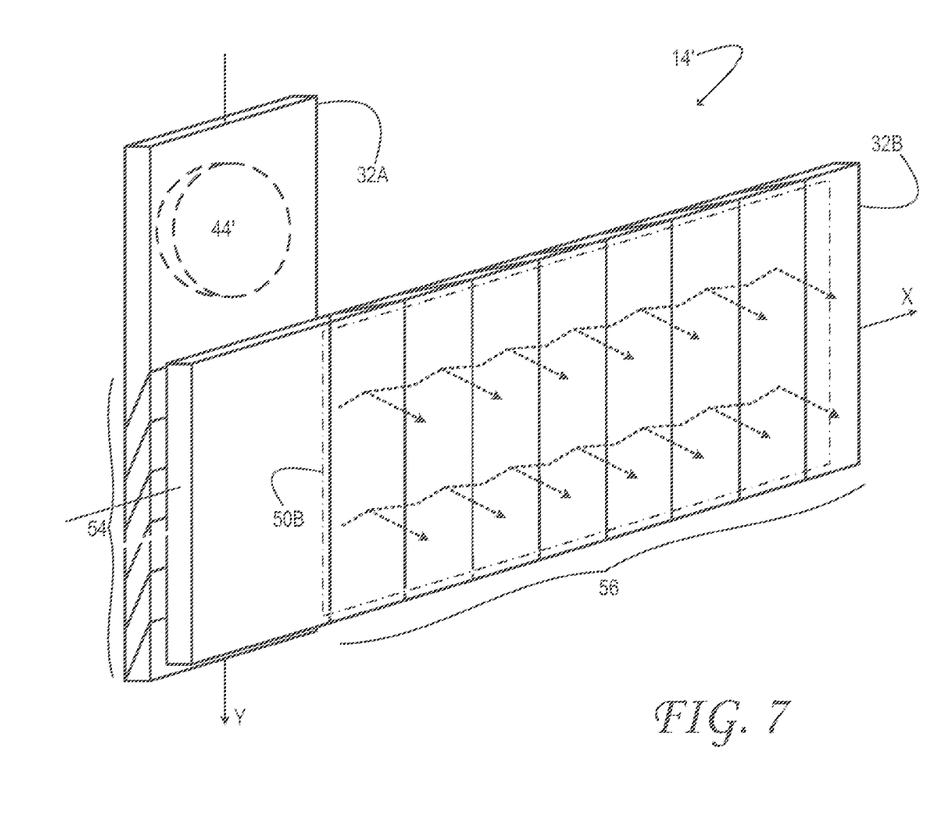
FIG. 7 shows a perspective view of the near-eye display system of FIG. 6.

FIGS. 6 and 7 show aspects of a near-eye display system 14' in one embodiment. FIG. 6 is a side view of the embodiment, and FIG. 7 is a perspective view. The illustrated near-eye display system includes an image former 26 configured to form a display image and to release the display image through exit pupil 28. As noted hereinabove, the image former may be an LCD, LCOS, or DMD array—optionally with an exit pupil 5 millimeters or less in length and in width. The system also includes lens 44', which is configured to receive the display image from the image former and to collimate the display image.

System 14' also includes a first series 54 of mutually parallel beamsplitters. The first series of beamsplitters are arranged to receive the display image from the image former, and to release the display image through an exit pupil 50A, which is longer than that of the image former. Accordingly, the exit pupil of the first series of beamsplitters is expanded in a vertical direction relative to the exit pupil of the image former. The mode of exit-pupil expansion may be substantially the same as described above, in the context of waveguide 32.

However, system 14' also includes a second series 56 of mutually parallel beamsplitters. The second series of beamsplitters are arranged to receive the display image from the first series of beamsplitters, and to release the display image through an exit pupil 50B, which is both longer and wider than that of the image former. Thus, the exit pupil of the second series of beamsplitters is expanded in a horizontal direction relative to the exit pupil of the image former and to that of the first series of beamsplitters.

In general, the second series 56 of beamsplitters will have a different alignment and a different orientation than the first series 54. In some embodiments, the second series of beamsplitters will also have a different structure. In the embodiment of FIGS. 6 and 7, the beamsplitters of the first series are aligned along the axis labeled Y, which is oriented vertically. For both series of beamsplitters, a longitudinal edge of each beamsplitter is perpendicular to the axis of alignment. The beamsplitters of the second series are aligned along the axis labeled X, which is oriented horizontally. In this embodiment, the X and Y axes are orthogonal to each other. In other embodiments, the axes of alignment of the two series of beamsplitters may be oblique to each other and/or oblique to the horizontal and vertical directions.

The beamsplitters of the current embodiment may be at least somewhat similar to those described hereinabove. For instance, each beamsplitter may comprise a coating supported on a transparent section. The coating may exhibit an incidence-angle dependent reflectance which is lowest in a notch-shaped region between normal and grazing incidence, as shown in FIG. 5. To that end, the present disclosure contemplates various kinds of beamsplitter structures. A beamsplitter may include a partially reflective array (RA), a surface-relief diffraction grating (SRG), or a volume hologram (VH), such as a switchable Bragg grating Accordingly, the first series of beamsplitters may be a series of any one of the structures here listed, while the second series may include any other structure. In one example embodiment, the first series may be a series of partially diffractive surface-relief diffraction gratings, and the second series may be a series of partially reflective arrays. This arrangement may be referred to as an SRG-RA structure. Other suitable dual-waveguide embodiments include RA-RA and VH-RA structures.

One potential disadvantage of the RA waveguide is non-uniformity—e.g., banding—in display-image illumination. Another disadvantage is manufacturing complexity, which may make it somewhat less desirable for use in low-cost HMD devices. On the other hand, SRG and VH structures may exhibit a strong wavelength dependence, thereby requiring a plurality of gratings to span the visible wavelength range. One attractive VH variant is the switchable Bragg grating, which, being an active optical component, offers a work-around for the wavelength-dependence issue. In particular, three stacked gratings may be used, with one grating configured for red light, another for green light, and another for blue light. In this embodiment, the image former may be operated in color-sequential mode, synchronized to the activation of the switchable Bragg gratings.

In one embodiment, the transmittance of each successive beamsplitter in the first and/or second series of beamsplitters may decrease in a direction of propagation of display light through that series of beamsplitters. This feature may be used to compensate for the stepwise reduction in the intensity of the display light as it propagates through the beamsplitters, which otherwise could result in the display image being brighter on one side than the other—e.g., brighter on the top than the bottom, or brighter on the left than the right. Accordingly, if beamsplitters in the series are reflective, then the reflectance of each successive beamsplitter may increase in the direction of propagation of display light through the series. In one particular embodiment, a final beamsplitter in the series may be substantially fully reflective. This aspect may be advantageous primarily for the first series 54 of beamsplitters—the vertical series in the illustrated embodiments—which can be located outside of the wearer's field of view.

In contrast, the beamsplitters of second series 56 are arranged directly in front of the wearer's eye. These beamsplitters may be configured with a more uniform transmittance across the series, so that the external imagery received through the waveguide does not appear abnormally dark at one end the field of view. Without being tied to any particular theory, it is believed that the waveguide arrangements disclosed herein exhibit a periscope effect whereby some external-image light from the entry end of a waveguide (the left end in the drawings) propagates through the waveguide and is discharged toward the opposite end. This effect partially compensates for the reduction of external image brightness that could result from a decrease in transmittance across the series of beamsplitters in the waveguide, so that a given reduction in transmittance causes less brightness reduction than would otherwise be expected.

In near-eye display system 14', the first series 54 of beamsplitters are arranged in first waveguide 32A. The second series 56 of beamsplitters are arranged in a second waveguide 32B, which is materially separate from the first waveguide. The configuration of the beamsplitters within their respective waveguides may be substantially as described above, for waveguide 32. As shown in FIG. 6, the first and second waveguides may be separated by an air gap 57, which optically decouples the first waveguide from the second. In other embodiments, the first and second waveguides may be separated by a material of lower refractive index than the transmissive material from which the waveguides are formed.

Figure 8:
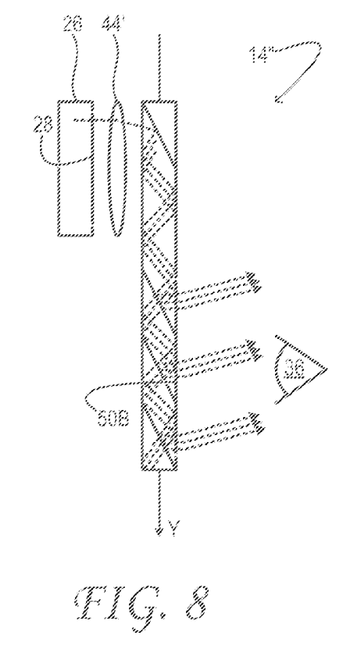
FIG. 8 shows a side view of another near-eye display system in accordance with an embodiment of this disclosure.
Figure 9:
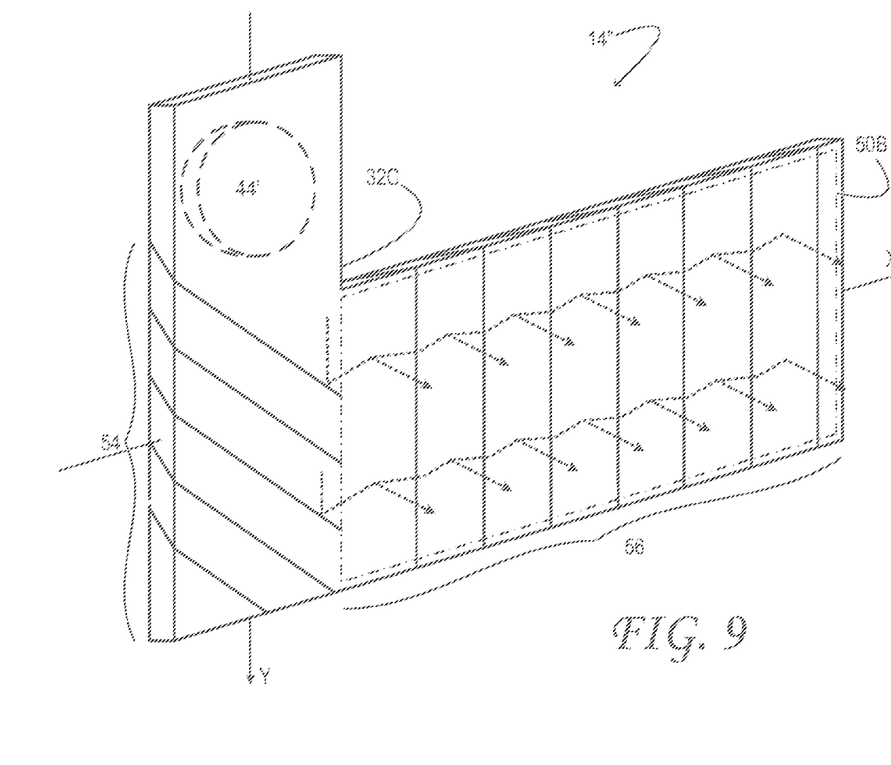
FIG. 9 shows a perspective view of the near-eye display system of FIG. 8.

FIGS. 8 and 9 show aspects of another near-eye display system 14" in one embodiment. FIG. 8 is a side view of the embodiment, and FIG. 9 is a perspective view. System 14" is similar in many respects to system 14', but in system 14", the first and second series of beamsplitters are arranged in the same waveguide.

In near-eye display system 14", the second series 56 of beamsplitters may be aligned and oriented substantially as described above. The first series 54, however, is aligned differently. In particular, a longitudinal edge of each beamsplitter of the first series is oblique to the axis of alignment of the beamsplitters, so that each beamsplitter is set on a diagonal with respect to the direction of propagation of display light. This feature causes the display image propagating down the first series to be turned 90° into the second series of beamsplitters. In this manner, a single waveguide provides both horizontal and vertical exit pupil expansion. In one embodiment, the beamsplitters of the first series may have a partially diffractive structure, which may be less costly to fabricate than equivalently oriented partially reflective arrays. In some embodiments, different beamsplitter technologies may be incorporated in a single waveguide. For instance, the SRG-RA structure may be fabricated on the same waveguide substrate—or on different substrates, as shown in FIG. 7.

Figure 10:
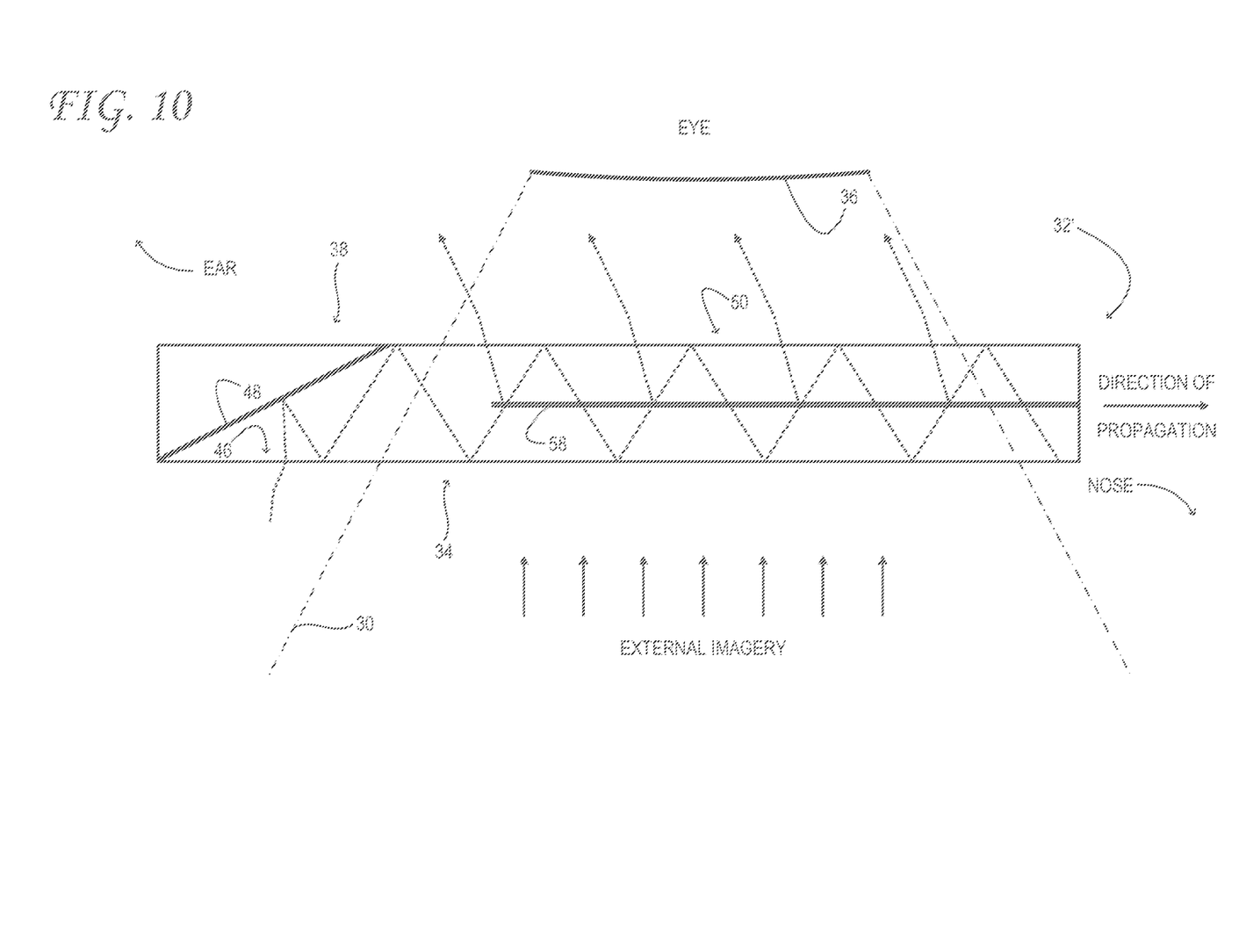
FIG. 10 shows aspects of another example waveguide in accordance with an embodiment of this disclosure.

Naturally, the particular waveguide structures in the foregoing drawings should not be understood in a limiting sense, for numerous other structures are contemplated as well. For instance, FIG. 10 shows aspects of another example waveguide 32'. In lieu of a series of discrete beamsplitters arranged obliquely, waveguide 32' includes one VH structure 58 aligned to a plane parallel to the front and back surfaces of the waveguide. In the embodiment illustrated in FIG. 10, the VH structure bisects the waveguide in the area behind exit pupil 50.

In this embodiment, display light couples into waveguide 32' as described hereinabove for waveguide 32. There, it propagates by TIR from the front and back surfaces of the waveguide. On each reflection from front surface 34 to back surface 38, the display light interacts with VH structure 58, resulting in a portion of that light being reflected out of the waveguide. Accordingly, a single VH structure may provide multiple beamsplitting interactions for each ray of display light propagating through the waveguide. In this manner, the VH structure may embody an entire series of discrete beamsplitter structures such as described in the foregoing embodiments. As in the foregoing embodiments, the multiple beamsplitting interactions provide exit-pupil expansion in one dimension.

It will be noted that the overall structure in FIG. 10 is in no way limited to VH structures, but is equally applicable to a suitable SRG structure. In other words, an SRG structure may be used in place of VH structure 58. In this case, the display light is partially diffracted out of the waveguide on each pass through the SRG structure, providing exit-pupil expansion in the direction of propagation.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A near-eye display system comprising:
an image former configured to form a display image and to release the display image through an exit pupil;
a first series of mutually parallel beamsplitters arranged to receive the display image from the image former; and
a second series of mutually parallel beamsplitters arranged to receive the display image from the first series of beamsplitters, and to release the display image through an exit pupil longer and wider than that of the image former, the second series of beamsplitters having a different structure, a different alignment, and a different orientation than the first series of beamsplitters.

2. The system of claim 1 wherein each beamsplitter of the first series comprises a partially reflective array.

3. The system of claim 1 wherein each beamsplitter of the first series comprises a surface-relief diffraction grating.

4. The system of claim 1 wherein each beamsplitter of the first series comprises a hologram.

5. The system of claim 1 wherein each beamsplitter of the first series comprises a switchable Bragg grating.

6. The system of claim 1 wherein each beamsplitter of the second series comprises a partially reflective array, a surface-relief diffraction grating, a hologram, or a switchable Bragg grating.

7. The system of claim 1 wherein the beamsplitters of the first series are aligned along a first axis, and wherein the beamsplitters of the second series are aligned along a second axis orthogonal to the first axis.

8. The system of claim 1 wherein each beamsplitter comprises a coating supported on a transparent substrate, and wherein the coating exhibits an incidence-angle dependent reflectance which is lowest in a notch-shaped region between normal and grazing incidence.

9. The system of claim 1 wherein the image former is a liquid-crystal display array with an exit pupil five millimeters or less in length and five millimeters or less in width.

10. A near-eye display system comprising:
an image former configured to form a display image and to release the display image through an exit pupil;
a lens configured to receive the display image from the image former and to collimate the display image;
a first series of mutually parallel beamsplitters arranged to receive the display image from the lens; and
a second series of partially reflective, mutually parallel beamsplitters arranged to receive the display image from the first series of beamsplitters, and to release the display image through an exit pupil longer and wider than that of the image former, the second series of beamsplitters having a different alignment and a different orientation than the first series of beamsplitters.

11. The system of claim 10 wherein the beamsplitters of the first series are aligned along a first axis, and wherein the beamsplitters of the second series are aligned along a second axis orthogonal to the first axis.

12. The system of claim 11 wherein the first axis is a vertical axis and the second axis is a horizontal axis, wherein the exit pupil of the first series of beamsplitters is expanded in a vertical direction relative to the exit pupil of the image former, and wherein the exit pupil of the second series of beamsplitters is expanded in a horizontal direction relative to the exit pupil of the image former and that of the first series of beamsplitters.

13. The system of claim 10 wherein the first series of beamsplitters are arranged in a first waveguide and configured to release the display image through an exit pupil longer than that of the image former, and wherein the second series of beamsplitters are arranged in a second waveguide materially separate from the first waveguide.

14. The system of claim 13 wherein the first and second waveguides are separated by an air gap or by a material of lower refractive index than that of the first and second waveguides.

15. The system of claim 13 wherein for each series of beamsplitters, a longitudinal edge of each beamsplitter is perpendicular to the axis of alignment of the series.

16. The system of claim 10 wherein the first and second series of beamsplitters are arranged in the same waveguide.

17. The system of claim 16 wherein a longitudinal edge of each beamsplitter of the first series is oblique to the axis of alignment of the beamsplitter, and wherein a longitudinal edge of each beamsplitter of the second series is perpendicular to the axis of alignment of the beamsplitter.

18. The system of claim 10 wherein a transmittance of each successive beamsplitter in the first and/or second series of beamsplitters decreases in a direction of propagation of display light through that series of beamsplitters.

19. A near-eye display system comprising:
an image former configured to form a display image and to release the display image through an exit pupil;
a first series of partially diffractive, mutually parallel beamsplitters aligned along a first axis and arranged to receive the display image from the image former; and
a second series of partially reflective, mutually parallel beamsplitters aligned along a second axis, orthogonal to the first axis, and arranged to receive the display image from the first series of beamsplitters and to release the display image through an exit pupil longer and wider than that of the image former, the second series of beamsplitters having a different alignment and a different orientation than the first series of beamsplitters and being at least partially transparent to imagery external to the near-eye display system;
a controller configured to provide control signals to the image former to cause the display image to be formed; and
a wearable mount configured to support the image former and the controller, and to hold the first and second series of beamsplitters directly in front of a wearer's eye.

20. The system of claim 19 wherein a reflectance of each successive beamsplitter in the first series of beamsplitters increases in a direction of propagation of display light through the first series of beamsplitters, and wherein a final beamsplitter in the series is substantially fully reflective.

* * * * *